United States Patent [19]

Jüng et al.

[11] Patent Number: 4,526,286
[45] Date of Patent: Jul. 2, 1985

[54] THERMOPLASTIC FUEL TANK HAVING A SPLASH BAFFLE

[75] Inventors: Norbert Jüng, Lampertheim; Edmund Lindner, Ludwigshafen; Volker Lohrbaecher, Weinheim, all of Fed. Rep. of Germany

[73] Assignee: BASF Aktiengesellschaft, Ludwigshafen, Fed. Rep. of Germany

[21] Appl. No.: 461,745

[22] Filed: Jan. 28, 1983

[30] Foreign Application Priority Data

Feb. 17, 1982 [DE] Fed. Rep. of Germany ....... 3205592

[51] Int. Cl.³ .................... B60K 15/02; B65D 25/04; B65D 1/24; B65D 6/28
[52] U.S. Cl. .................... 220/22; 220/5 A; 220/72; 280/5 A
[58] Field of Search .................... 220/22, 20, 72, 5 R, 220/5 A; 137/576; 280/5 A

[56] References Cited

U.S. PATENT DOCUMENTS 2,678,660  5/1954  Gurin .................... 220/20
3,552,599  1/1971  Redding .................... 220/72
4,178,955  12/1979  Dau .
4,331,342  5/1982  van der Lely .................... 137/576

FOREIGN PATENT DOCUMENTS 1455496  5/1969  Fed. Rep. of Germany .
1780682  2/1977  Fed. Rep. of Germany .
3213070  4/1982  Fed. Rep. of Germany .

Primary Examiner—George E. Lowrance
Attorney, Agent, or Firm—Keil & Weinkauf

[57] ABSTRACT

A fuel tank made of a thermoplastic, having a splash baffle formed by two ridge-like protrusions (2, 8) molded from mutually opposite tank walls (3, 4), which protrusions touch and are joined to one another at the points of contact (5) (and which tank may or may not possess a device for hindering fuel outflow), wherein the wall of the splash baffle has openings (6) which provide a connection between the tank space and the splash baffle over a threshold (9) which favors retention of fuel within the baffle.

5 Claims, 9 Drawing Figures

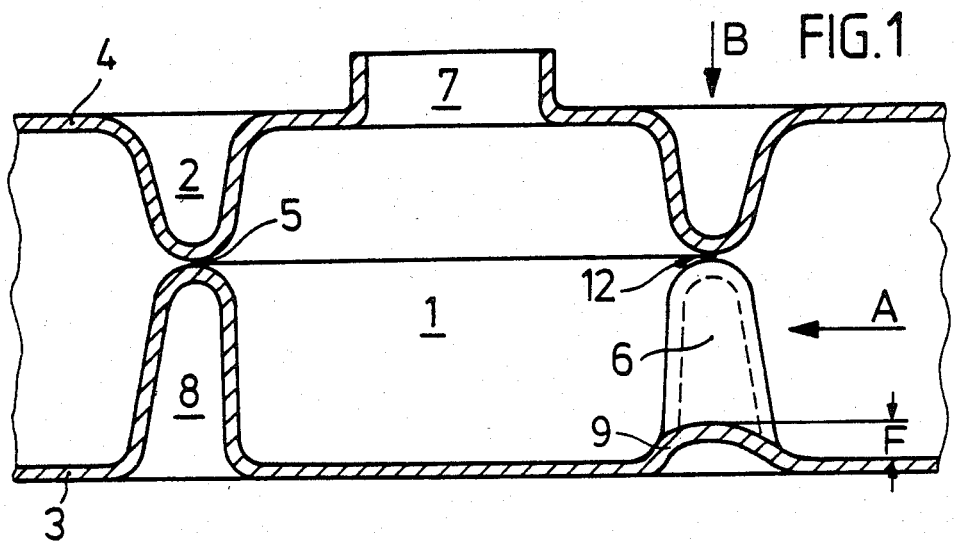
FIG. 1
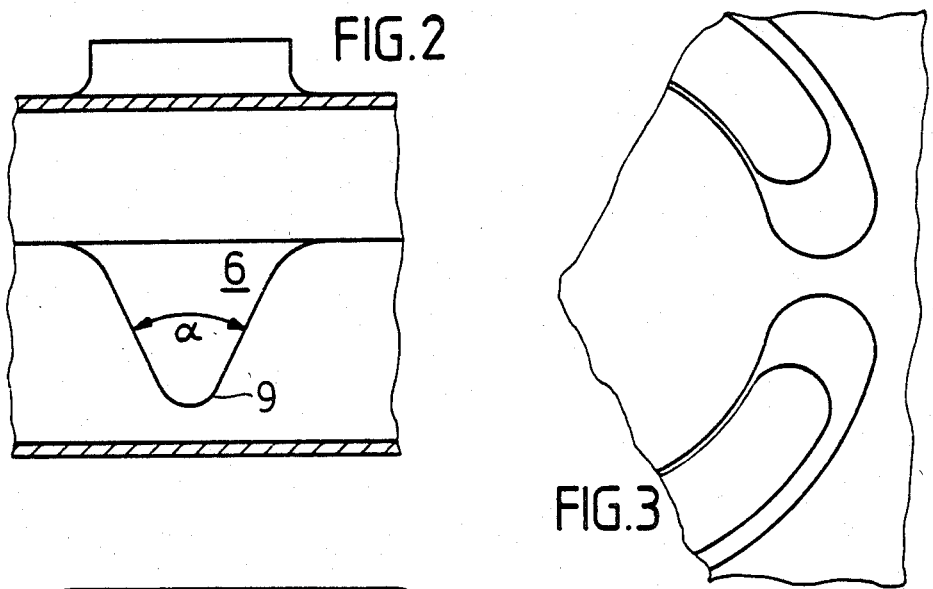
FIG. 2
FIG. 3
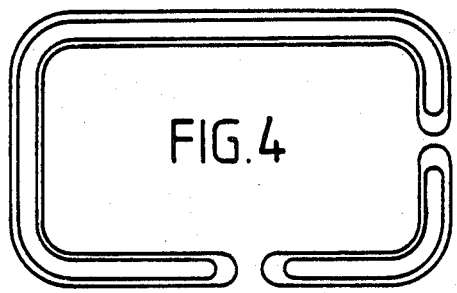
FIG. 4

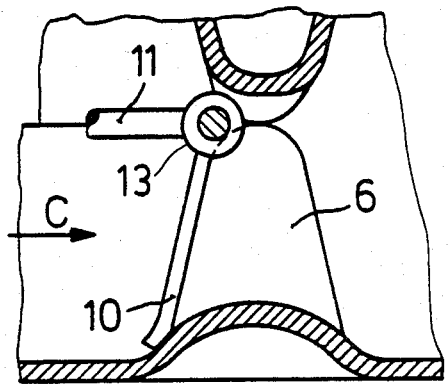
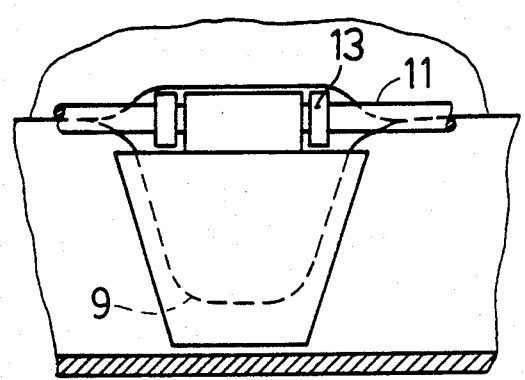
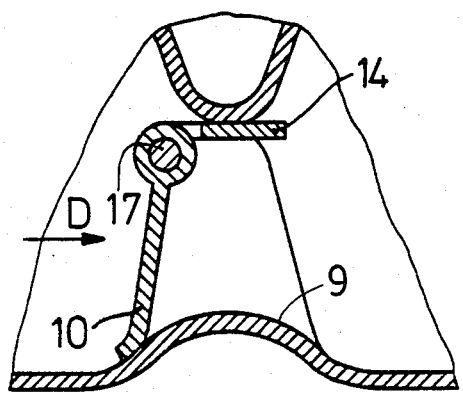
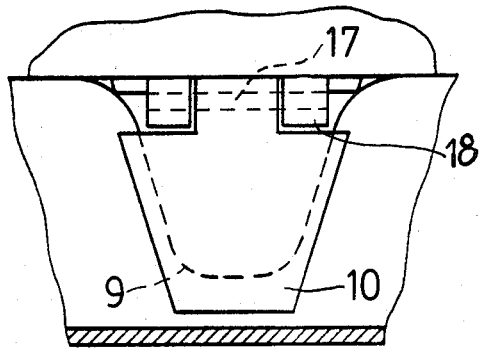
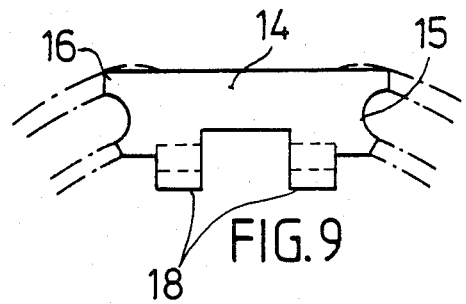

THERMOPLASTIC FUEL TANK HAVING A SPLASH BAFFLE

The present invention relates to a fuel tank made of a thermoplastic, having a splash baffle formed by two ridge-like protrusions molded from mutually opposite tank walls, which protrusions touch and are joined to one another at the points of contact (and which tank may or may not possess a device for hindering fuel outflow).

In motor vehicles with internal combustion engines utilizing fuel injection, it is necessary that while fuel is being taken from the tank no air should get into the fuel feed system until the entire contents of the tank have been consumed.

Hence, in such vehicles the fuel is as a rule taken from a position in the tank where there is always fuel present until the tank is completely empty. It is necessary to ensure that even when the vehicle is following a curve or an incline, and also on acceleration or slowing down, fuel can be taken from the tank over a certain period even if the remaining fuel present in the tank collects in places remote from the point from which fuel is taken. This is particularly necessary if the tank is almost empty.

Since, for space reasons, a sac-like recess in the tank bottom, which is located below the level of the tank and produces the above effect, can only rarely be employed, apparatuses have been designed which lie in the tank and cause the residual fuel to collect at the point from which fuel is taken.

In general, these are pot-shaped part-spaces, which are enclosed by the tank but are separated from the remaining tank space, and in which the fuel collects, for example as a result of the shaking movements of the vehicle or of the suction action produced when the excess of the fuel taken from the tank is conveyed back into the tank.

Such collecting devices are referred to as splash baffles, bowl dampers, subsidiary chambers, etc.

These devices can easily be introduced into a tank fabricated from two sheet metal or plastic shells, before these two halves are joined together. The task becomes more difficult if the tank is to be made substantially in one piece from a thermoplastic by blow-molding or rotational sintering, because the orifices on such tanks are in general insufficiently large to allow subsequent introduction of a splash baffle into the interior of the tank. Introducing the splash baffle during production of the tank, which is also possible in the case of blow-molding, is expensive and labor-intensive, and presents certain hazards concerning operating reliability.

Both possible methods have the disadvantage that the splash baffle must be produced in a separate process stage and must be fixed securely to the tank in a further process stage.

In another method of manufacture, it is possible to mold the splash baffle from the walls of the fuel tank. In this instance, the walls of the tank are so constructed that they enclose a collecting space separated from the remaining tank space, in which collecting space the slopping fuel collects under the action of adjacent tank walls or of special guide walls which are arranged around the collecting space and are also formed during the molding process. These guide walls can be arranged spirally or as concentric open rings or in any other suitable manner.

An advantage of these molded-on splash baffles is that they are produced during actual manufacture of the fuel tank, without particular additional effort; their disadvantage is that because of the surrounding tapping system of guide walls they require a relatively large tank bottom area, especially in the case of blow-molded tanks, or tanks produced from two shells by a twin thermoforming process, because the wall thickness resulting between the individual guide walls and the splash baffle depends on the mutual spacing of these guide wall zones, on the height of the guide walls and on the original wall thickness of the parison or of the sheets being thermoformed.

A further disadvantage of the prior art splash baffles molded integrally onto the tank is that being a part of the tank bottom and being formed by molding the latter, they are open on their top faces; the fuel collected therein can slop out of the splash baffle under the acceleration acting on the vehicle.

German Laid-Open Application DOS No. 1,455,496 describes a fuel tank, provided with a splash baffle, for vehicles, in which the splash baffle is formed by 2 ring-shaped depressions in two mutually opposite walls, which are welded together at about half the height of the tank. The interior of this splash baffle has no connection, formed during the actual tank production process, with the surrounding tank space. Rather, such a connection has to be produced by a connecting line fitted additionally, for example a hose. Such a hose connection presents a certain safety hazard if it is located below the tank bottom because, if the vehicle travels over uneven ground, the hose can be torn off, and because, even apart from this, it entails leakage hazards.

All prior art splash baffles molded integrally with the tank body have the further disadvantage that they do not possess any device which hinders the flow of fuel from the splash baffle. It is true that splash baffles with non-return valves attached thereto and hindering the outflow of fuel have been disclosed. These are, however, in every case separately produced splash baffles, whose introduction into the present tank entails the disadvantages mentioned above.

It is an object of the present invention to provide a fuel tank made of a thermoplastic and having a splash baffle, which tank is produced, for example, by blow-molding, by twin thermoforming or by rotational molding and has a device for hindering the flow of fuel from the splash baffle, the assembly being so designed that the splash baffle is molded in the same operation as the tank, is closed at the top, and is provided, in its side walls, with orifices which lie within the tank and allow ingress of fuel.

We have found that this object is achieved, according to the invention, if the wall of the splash baffle has one or more openings which provide a connection over a threshold between the tank space and the splash baffle.

The sub-claims relate to advantageous further embodiments of the inventive concept.

FIGS. 1 to 9 illustrate various embodiments of the invention.

FIG. 1 shows a section through a fuel tank and its integrally connected splash baffle.

FIG. 2 is a partial view, in the direction of the arrow A (FIG. 1), of the side wall of the splash baffle.

FIG. 3 is a portion of a plan view, in the direction of the arrow B in FIG. 1, onto the lower part of the splash baffle, having a circular base surface, molded onto the tank bottom.

FIG. 4 is a plan view, in the direction of the arrow B in FIG. 1, onto the lower part of a splash baffle, having, for example, a rectangular base surface and two perforations in accordance with the invention.

FIG. 5 is a side view of a non-return valve, which is fixed to a flexible ring element.

FIG. 6 is a view of the valve of FIG. 5, in the direction of the arrow C.

FIG. 7 is a side view of a non-return valve fixed to a clamping member.

FIG. 8 is a view of the valve according to FIG. 7, in the direction of the arrow D.

FIG. 9 is a plan view of the clamping member according to FIG. 7 with valve removed.

The splash baffle 1 according to the invention consists of two conventional ridge-shaped protrusions, namely 8 on the tank bottom 3, and 2 on the tank top 4, which each point to the interior of the tank and enclose a certain area between them; these protrusions touch one another or are completely or partially joined to one another, at their contact points 5, for example by welding.

In the wall of the splash baffle thus formed there are provided, preferably in the lower ridge-shaped protrusion 8, one or more opening 6 which constitute a connection between the tank space surrounding the splash baffle and the interior of the latter. These opening 6 can be produced particularly readily if they are V-shaped. A threshold 9 of height F remains between the lowest point of the opening 6 and the bottom of the splash baffle or tank, to favors a certain supply of fuel remaining in the splash baffle.

The shape of the bottom surface circumscribed by the splash baffle depends on the particular circumstances in respect of spatial dimensions and of operation of the complete unit. The surface may be circular (FIG. 3) or, for example, rectangular (FIG. 4).

Above the splash baffle there is an orifice 7 through which devices for taking out fuel, returning fuel, indicating the fuel level etc. can be introduced into the tank. It is also possible to pass through the orifice 7 a device, described in more detail herein, which fits from the interior of the splash baffle 1 against the opening 6 and possesses a non-return valve which hinders the flow of fuel from the splash baffle.

In a particularly advantageous embodiment, the opening 6 is V-shaped, with an aperture angle $\alpha \geq 50°$ (FIG. 2), a radius of curvature at the tip of the V-shaped opening of $\geq 5$ mm, and a radius of curvature at the transition to the rim of the baffle, of $\geq 20$ mm (FIG. 2).

As previously mentioned, the threshold 9 serves the purpose of retaining a certain residual amount of fuel in the baffle. However, under adverse acceleration conditions, or adverse inclination of the tank, it is possible that the fuel will flow out of the splash baffle over this threshold, especially if the tank is almost empty. To reinforce the action of the threshold 9 in favoring retention of fuel in the baffle, the invention provides, as a further feature, a non-return valve 10 (FIG. 5 and 6). In contrast to the conventional non-return valves on the splash baffles, the valve 10 can, if desired, be fitted subsequently into the novel tank.

In an exemplary embodiment, the non-return valve 10 is movably attached to a flexible ring element 11, so that the fuel slopping into the splash baffle raises it and allows the fuel to enter the baffle. If, however, the fuel present in the splash baffle presses against the flap, the latter rests against the inner wall bounding the opening 6 and hence makes it difficult for the fuel to flow back. To fit the non-return device, the flexible ring element 11, with the non-return valve 10 attached thereto, is introduced into the splash baffle through the orifice 7. The diameter of the ring element 11 is so chosen that it rests against the notch 12 formed at the points of contact 5 between the upper and lower parts of the splash baffle (FIG. 1) and thus securely holds the non-return valve 10. Studs 13 attached to the ring element 11 (FIG. 6) secure the position of the ring element 11 and of the non-return valve 10 relative to the opening 6. The ring element can be, for example, a flexible wire cable or a metal coil spring, or can be made of a flexible fuel-resistant plastic, for example polyethylene, polypropylene or polyformaldehyde.

In another embodiment of the non-return device (FIGS. 7–9) the non-return valve 10 is movably attached to a clamping member 14 which has notches 15 at its ends. These notches create two projections 16. The clamping member 14 consists of a material which permits a certain degree of resilient deformation, for example polyformaldehyde, polyethylene or polypropylene, so that it is possible to bend the two projections 16 sufficiently for the clamping member to be pushed from within the splash baffle through the opening 6, so that it is located at the uppermost point of the opening 6 and there engages by its notches 15 the notch 12 formed by protrusions 2 and 8. The valve 10 is movably attached by a shaft 17 extending between eyes 18 formed on the clamping member 14.

The ring element 11 or clamping member 14 and the non-return valve attached thereto are of such size that they can be introduced into the splash baffle through the tank orifice 7.

We claim:

1. An improved fuel tank comprising: two mutually opposite tank walls each having inward ridge-like protrusions formed therein, said protrusions touching and being joined to one another at the points of contact to form a splash baffle within said tank between said walls, at least one opening formed in a lower positioned protrusion, and a threshold spacing said opening from the tank wall in which said lower positioned protrusion is formed, said threshold favoring retention of fuel within said splash baffle.

2. A fuel tank as defined in claim 1, wherein the opening is V-shaped.

3. A fuel tank as defined in claim 2, wherein the aperture angle $\alpha$ of the V-shaped opening is $\geq 50°$, the radius of curvature at the tip of the opening is $\geq 5$ mm, and the radius of curvature at the transition of the opening to the lower positioned protrusion is $\geq 20$ mm.

4. A fuel tank as defined in claim 1, wherein a non-return device, consisting of a non-return valve, is located inside the splash baffle with said valve at said opening.

5. A fuel tank as defined in claim 5, wherein the non-return valve is movably fixed to a clamping member.

* * * * *

UNITED STATES PATENT AND TRADEMARK OFFICE
CERTIFICATE OF CORRECTION

PATENT NO. : 4,526,286
DATED : Jul. 2, 1985
INVENTOR(S) : JUNG ET AL

It is certified that error appears in the above-identified patent and that said Letters Patent are hereby corrected as shown below:

Page 1, [75]  "Norbert Jüng"  should be -- Norbert Jung -- .

Column 4, claim 5, line 63  "5" should be -- 4 -- .

Signed and Sealed this

Fifteenth Day of October 1985

[SEAL]

Attest:

Attesting Officer

DONALD J. QUIGG

Commissioner of Patents and
Trademarks—Designate